(12) United States Patent
Brodie et al.

(10) Patent No.: US 9,016,080 B2
(45) Date of Patent: Apr. 28, 2015

(54) BATTERY HEATING AND COOLING SYSTEM

(75) Inventors: Bradley Brodie, Milford, MI (US);
Kwangtaek Hong, Ann Arbor, MI (US);
Bryan Styles, South Lyon, MI (US)

(73) Assignee: DENSO International America, Inc., Southfield, MI (US)

( * ) Notice: Subject to any disclaimer, the term of this patent is extended or adjusted under 35 U.S.C. 154(b) by 636 days.

(21) Appl. No.: 13/051,438

(22) Filed: Mar. 18, 2011

(65) Prior Publication Data

US 2012/0234518 A1  Sep. 20, 2012

(51) Int. Cl.
| | |
|---|---|
| B60H 1/32 | (2006.01) |
| F28D 20/02 | (2006.01) |
| B60H 1/00 | (2006.01) |
| H01M 10/625 | (2014.01) |
| H01M 10/663 | (2014.01) |
| F28D 20/00 | (2006.01) |

(Continued)

(52) U.S. Cl.
CPC .......... *F28D 20/028* (2013.01); *B60H 1/00278* (2013.01); *B60H 1/00385* (2013.01); *B60H 1/00907* (2013.01); *B60H 2001/00307* (2013.01); *B60H 2001/00949* (2013.01); *F28D 2020/006* (2013.01); *F28D 2021/008* (2013.01); *Y02E 60/145* (2013.01); *H01M 10/5016* (2013.01); *H01M 10/5063* (2013.01); *H01M 10/5075* (2013.01); *H01M 10/5095* (2013.01)

(58) Field of Classification Search
CPC .............. F28D 20/028; H01M 6/5038; H01M 10/5016; H01M 10/5095; B60H 1/00385; B60H 1/00907; B60H 1/00278
USPC ............. 62/117, 238.3, 239, 324.1; 180/68.2; 165/104.19; 454/75
See application file for complete search history.

(56) References Cited

U.S. PATENT DOCUMENTS

| | | | |
|---|---|---|---|
| 4,415,847 A | | 11/1983 | Galloway |
| 5,549,153 A | * | 8/1996 | Baruschke et al. ............. 165/42 |

(Continued)

FOREIGN PATENT DOCUMENTS

| | | | | |
|---|---|---|---|---|
| DE | 102005048241 A1 | * | 4/2007 | ............... B60H 1/32 |
| DE | 102005048241 A1 | * | 4/2007 | ............... B60K 1/04 |

(Continued)

OTHER PUBLICATIONS

Office action dated Mar. 1, 2013 in corresponding German Application No. 10 2012 103099.5.

(Continued)

*Primary Examiner* — Frantz Jules
*Assistant Examiner* — Emmanuel Duke
(74) *Attorney, Agent, or Firm* — Harness, Dickey & Pierce, P.L.C.

(57) ABSTRACT

A system may include a first heat exchanger, a pumping device, and a valve. The pumping device may be in fluid communication with the first heat exchanger. The valve may receive a fluid from the pumping device and may be movable between a first position allowing the fluid through a first flow path and a second position to allow the fluid to flow through a second flow path. The first heat exchanger may be in heat transfer relation with an energy storage device such that heat may be extracted from the energy storage device when the valve is in the first position. Heat may be transferred from the first heat exchanger to the energy storage device when the valve is in the second position.

18 Claims, 11 Drawing Sheets

(51) Int. Cl.
*F28D 21/00* (2006.01)
*H01M 10/6561* (2014.01)
*H01M 10/6567* (2014.01)

(56) References Cited

U.S. PATENT DOCUMENTS

| | | | |
|---|---|---|---|
| 5,937,664 A | 8/1999 | Matsuno et al. | |
| 6,082,128 A | 7/2000 | Lake et al. | |
| 6,467,286 B2 | 10/2002 | Hasebe et al. | |
| 6,481,230 B2 | 11/2002 | Kimishima et al. | |
| 6,550,265 B2 | 4/2003 | Takeuchi et al. | |
| 6,574,976 B2 | 6/2003 | Takano et al. | |
| 6,705,101 B2 * | 3/2004 | Brotz et al. | 62/198 |
| 6,750,630 B2 | 6/2004 | Inoue et al. | |
| 6,923,012 B2 | 8/2005 | Kurata et al. | |
| 6,942,938 B2 * | 9/2005 | Derflinger et al. | 429/434 |
| 6,971,246 B2 | 12/2005 | Kurata et al. | |
| 7,013,659 B2 | 3/2006 | Yoshida et al. | |
| 7,013,966 B2 | 3/2006 | Takano et al. | |
| 7,025,159 B2 | 4/2006 | Smith et al. | |
| 7,028,767 B2 | 4/2006 | Takano et al. | |
| 7,059,147 B2 | 6/2006 | Inoue | |
| 7,096,683 B2 | 8/2006 | Smith | |
| 7,147,071 B2 | 12/2006 | Gering et al. | |
| 7,152,417 B2 | 12/2006 | Morishita et al. | |
| 7,607,501 B2 | 10/2009 | Smith et al. | |
| 7,631,512 B2 | 12/2009 | Smith | |
| 7,658,083 B2 | 2/2010 | Zhu et al. | |
| 2001/0040061 A1 | 11/2001 | Matuda et al. | |
| 2003/0209026 A1 * | 11/2003 | Sakuma | 62/324.1 |
| 2005/0133215 A1 * | 6/2005 | Ziehr et al. | 165/202 |
| 2006/0060340 A1 * | 3/2006 | Busse et al. | 165/202 |
| 2007/0022772 A1 | 2/2007 | Zhu et al. | |
| 2007/0089442 A1 | 4/2007 | Tsuchiya | |
| 2007/0157647 A1 | 7/2007 | Duhme et al. | |
| 2007/0175623 A1 | 8/2007 | Park et al. | |
| 2008/0078542 A1 * | 4/2008 | Gering et al. | 165/202 |
| 2008/0202741 A1 | 8/2008 | Lee et al. | |
| 2008/0236181 A1 | 10/2008 | Zhu et al. | |
| 2008/0251235 A1 | 10/2008 | Zhou | |
| 2009/0071178 A1 * | 3/2009 | Major et al. | 62/239 |
| 2009/0139781 A1 | 6/2009 | Straubel | |
| 2009/0142628 A1 | 6/2009 | Okada et al. | |
| 2009/0205353 A1 * | 8/2009 | Takahashi | 62/324.1 |
| 2009/0243538 A1 | 10/2009 | Kelty et al. | |
| 2009/0246606 A1 | 10/2009 | Shimizu | |
| 2009/0248204 A1 | 10/2009 | Kikuchi et al. | |
| 2009/0249802 A1 | 10/2009 | Nemesh et al. | |
| 2009/0249807 A1 * | 10/2009 | Nemesh et al. | 62/117 |
| 2009/0280395 A1 * | 11/2009 | Nemesh et al. | 429/62 |
| 2009/0317697 A1 * | 12/2009 | Dogariu et al. | 429/62 |
| 2010/0009246 A1 | 1/2010 | Maitre et al. | |
| 2010/0012295 A1 * | 1/2010 | Nemesh et al. | 165/104.19 |
| 2010/0025006 A1 | 2/2010 | Zhou | |
| 2010/0089547 A1 * | 4/2010 | King et al. | 165/42 |
| 2010/0175406 A1 * | 7/2010 | Wankhede et al. | 62/285 |
| 2010/0258063 A1 * | 10/2010 | Thompson | 123/41.19 |
| 2011/0139397 A1 | 6/2011 | Haussmann | |

FOREIGN PATENT DOCUMENTS

| | | | | |
|---|---|---|---|---|
| DE | 102008039908 A1 * | 3/2010 | | F25B 15/06 |
| JP | 2004279014 | * | 10/2004 | F25B 1/00 |
| JP | 2008-051499 | | 3/2008 | |
| JP | 2011-068348 | | 4/2011 | |
| WO | WO 2011029538 A1 * | 3/2011 | | F25B 15/06 |
| WO | WO 2011/159619 | | 12/2011 | |

OTHER PUBLICATIONS

Smith, Kandler, et al. National Renewable Energy Laboratory. PHEV Battery Standby Thermal Management for a Longer Life, Lower Cost Battery System. Conference call for industry partners. Sep. 24, 2009.
Office Action issued May 7, 2014 in corresponding JP Application No. 2012-072129 (with English translation).

* cited by examiner

BATTERY HEATING AND COOLING SYSTEM

FIELD

The present disclosure relates to a system for heating and cooling a battery, and particularly, a battery for a vehicle.

BACKGROUND

This section provides background information related to the present disclosure and is not necessarily prior art.

Many vehicles include batteries that provide electrical power to a variety of electrical systems and accessories in the vehicle. Hybrid and plug-in electric vehicles driven by electric motors powered by on-board battery packs are becoming more and more popular. Batteries typically perform best when operating within a specific temperature range. The present disclosure provides a system for heating and/or cooling one or more batteries to maintain the batteries within a predetermined temperature range to optimize the performance and life of the batteries.

SUMMARY

This section provides a general summary of the disclosure, and is not a comprehensive disclosure of its full scope or all of its features.

In one form, the present disclosure provides a system that may include a first heat exchanger, a pumping device, and a valve. The pumping device may be in fluid communication with the first heat exchanger. The valve may receive a fluid from the pumping device and may be movable between a first position allowing the fluid through a first flow path and a second position to allow the fluid to flow through a second flow path. The first heat exchanger may be in heat transfer relation with an energy storage device such that heat may be extracted from the energy storage device when the valve is in the first position. Heat may be transferred from the first heat exchanger to the energy storage device when the valve is in the second position.

In another form, the present disclosure provides a system for controlling a temperature of a battery. The system may include a first fluid circuit having a first heat exchanger and a first compressor. The first compressor may circulate a first fluid through the first fluid circuit. The first heat exchanger may be in heat transfer relation with the battery. The first fluid in the first fluid circuit may be fluidly isolated from a vehicle climate control system. The first fluid enters the first compressor at a first pressure and is discharged from the compressor at a second pressure that is substantially higher than the first pressure.

In yet another form, the present disclosure provides a system for a vehicle. The vehicle may include a cabin and a battery. The system may include a first fluid path and a second fluid path. The first fluid path may include a first heat exchanger providing a cooling effect to air within the cabin. The second fluid path may include a second heat exchanger and a valve. The second heat exchanger may be in heat transfer relation with the battery. The valve may be movable between a first position allowing fluid at a first temperature to flow through the second heat exchanger to extract heat from the battery and a second position allowing fluid at a second temperature to flow through the second heat exchanger to transfer heat from the fluid to the battery. The second temperature may be higher than the first temperature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
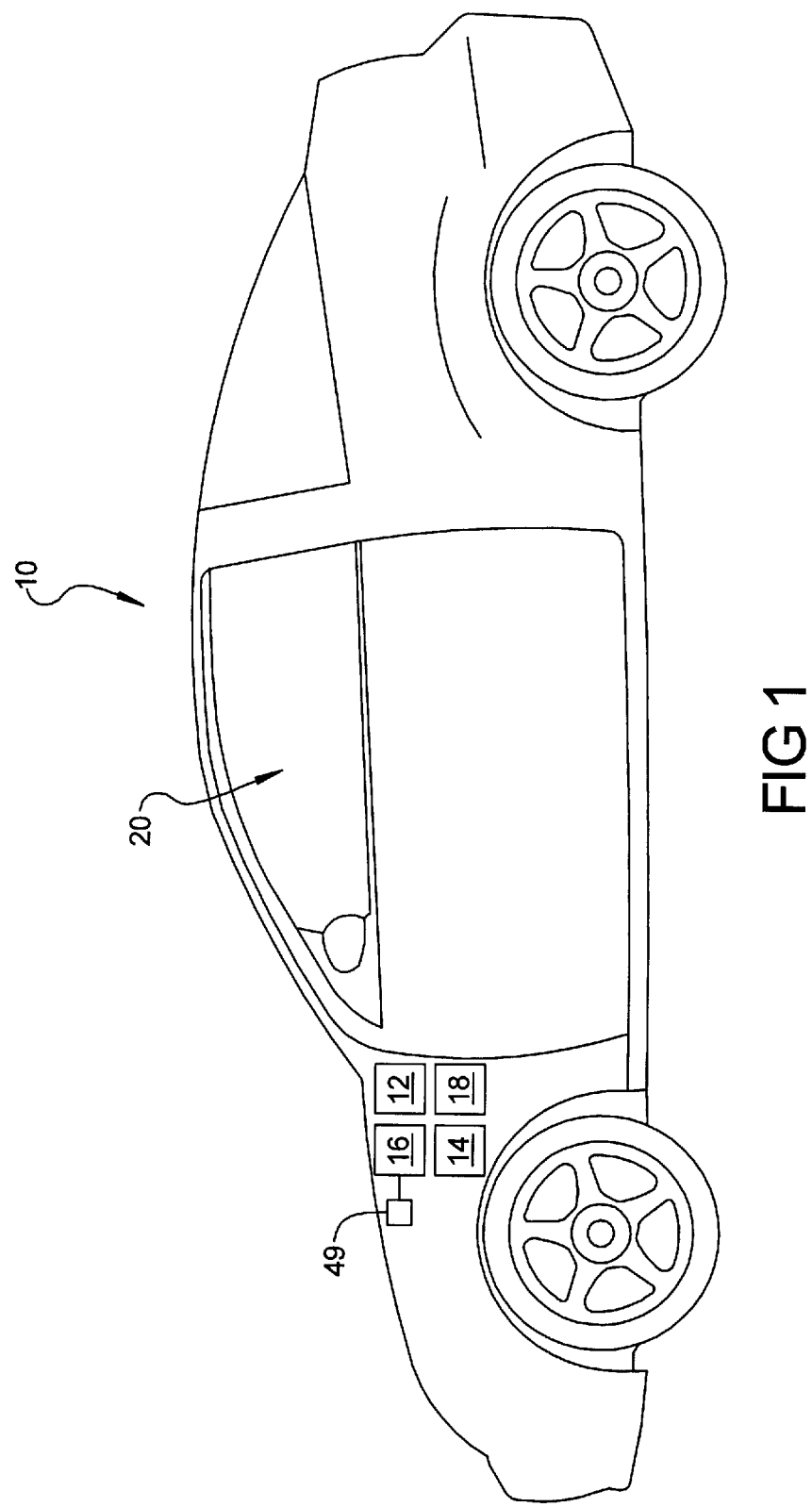
FIG. 1 is a schematic representation of a vehicle according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
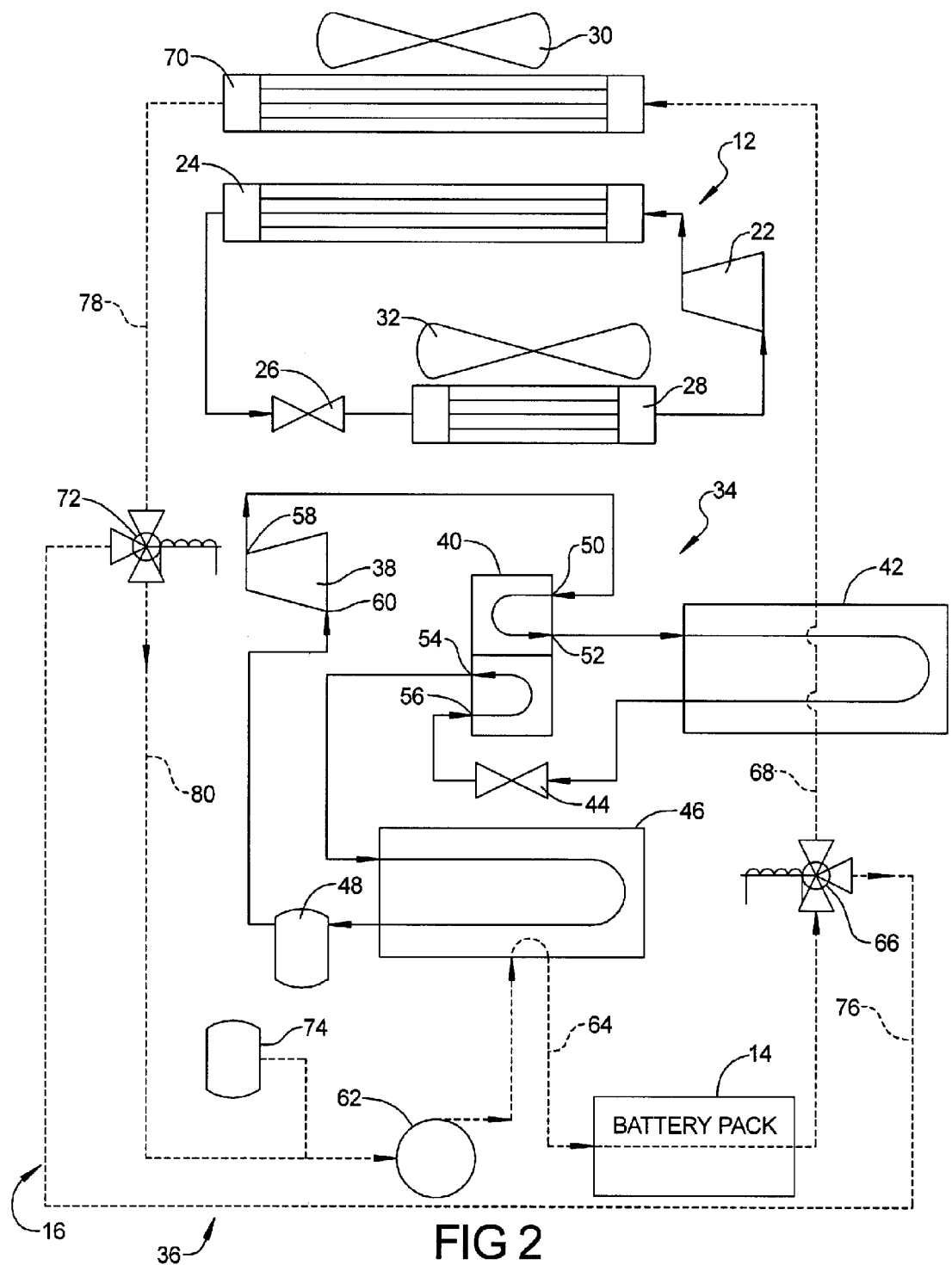
FIG. 2 is a schematic representation of a battery heating and cooling system in a cooling mode according to the principles of the present disclosure.
Figure 3:
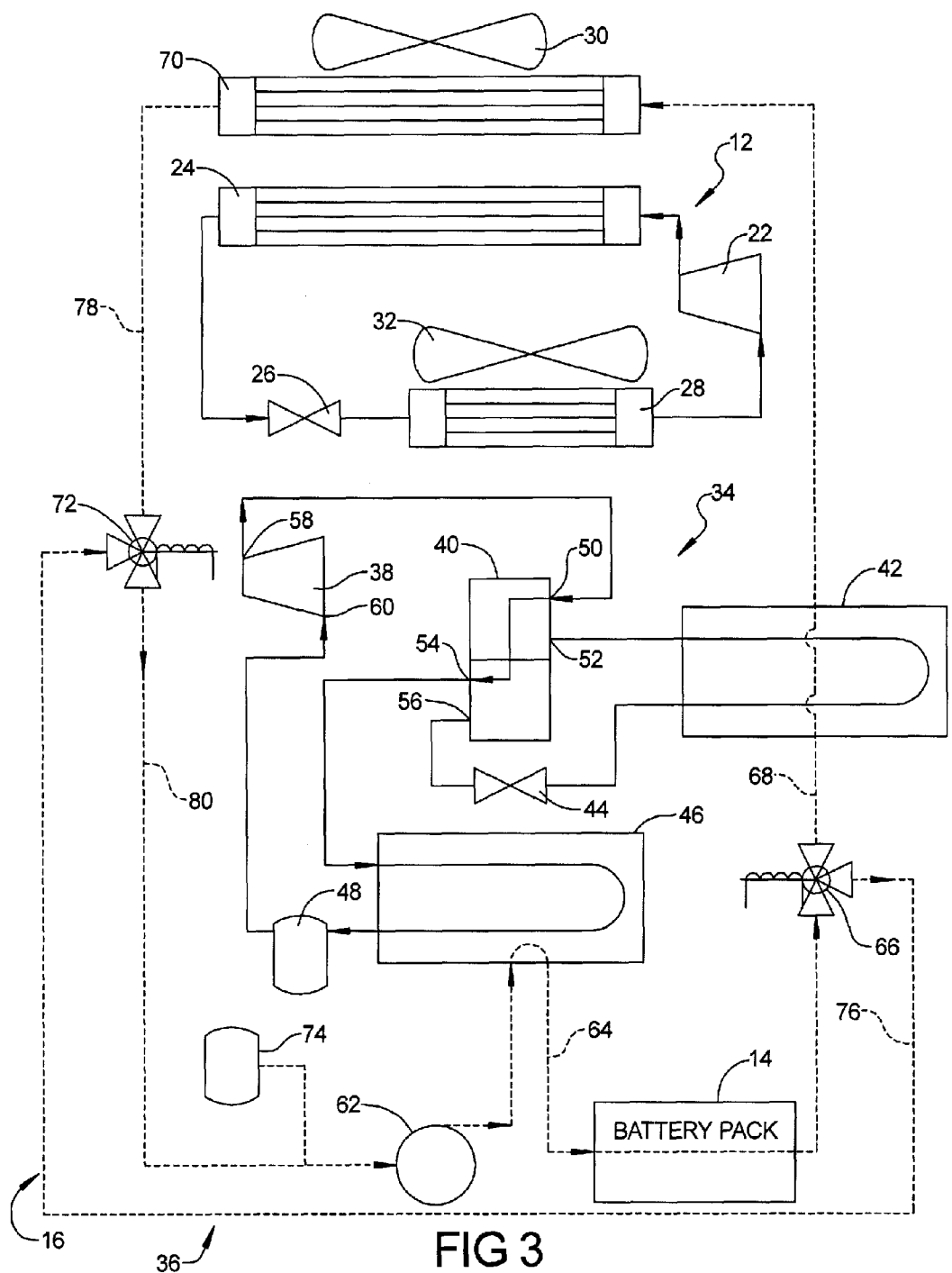
FIG. 3 is a schematic representation of the battery heating and cooling system of FIG. 2 in a heating mode according to the principles of the present disclosure.

With reference to FIGS. 1-3, a vehicle 10 is provided and may include a heating, ventilation and air conditioning (HVAC) system 12, a battery pack 14, and a battery heating and cooling system 16. The vehicle 10 may include an internal combustion engine and/or an electric motor 18 adapted to drive the vehicle. That is, the vehicle 10 may include a conventional powertrain, a hybrid powertrain or an electrical powertrain. The HVAC system 12 may be operable to heat and cool a cabin 20 of the vehicle 10. The battery pack 14 may include one or more batteries providing electrical power for one or more electrical systems of the vehicle 10. In some embodiments, the battery pack 14 may provide electrical power for the motor 18. As will be subsequently described, the battery heating and cooling system 16 may be operable in a heating mode and a cooling mode to respectively heat and cool the battery pack 14 to maintain the one or more batteries within a temperature range that may maximize the life of the batteries and optimize their performance characteristics. In some embodiments, the battery heating and cooling system 16 may be a stand-alone system, in that it may be separate and distinct from the HVAC system 12 and operate independently therefrom.

The HVAC system 12 may include a working fluid circuit having a compressor 22, a condenser 24, an expansion device 26, and an evaporator 28. The compressor 22 may receive a working fluid (e.g., R-12, R-134a, HFO-1234yf, carbon dioxide, etc.) at a suction pressure and temperature and discharge the working fluid at a discharge pressure and temperature that are higher than the suction pressure and temperature. From the compressor, the working fluid may flow to the condenser 24 in which heat may be rejected from the working fluid to ambient air. A first fan 30 may force air across the condenser 24 to facilitate heat transfer between the ambient air and the working fluid.

From the condenser 24, the working fluid may flow through the expansion device 26. The expansion device 26 may be a solenoid valve, thermal expansion valve, capillary tube or an orifice tube, for example, or any other suitable device. The working fluid exiting the expansion device 26 may be at a relatively low temperature and pressure. From the expansion device 26, the working fluid may flow through the evaporator 28 in which heat from ambient air is absorbed by the low temperature working fluid therein. A second fan 32 may force air across the evaporator 28 and into the cabin 20 of the vehicle 10 to cool the cabin 20 to a desired temperature.

The battery heating and cooling system 16 may be distinct from and operate independently from the HVAC system 12. The battery heating and cooling system 16 may include a first fluid circuit 34 (shown in FIGS. 2 and 3 in solid lines) and a second fluid circuit 36 (shown in FIGS. 2 and 3 in dashed lines). The first fluid circuit 34 may define a hermetically sealed fluid pathway including a compressor 38, a four-way valve 40, a first heat exchanger 42, an expansion device 44, a second heat exchanger 46, and an accumulator 48. A control module 49 (shown schematically in FIG. 1) may control operation of the compressor 38, which may circulate a working fluid, such as R-152a, R-245, R-12, R-134a, HFO-1234yf, or carbon dioxide, for example, through the first fluid circuit 34. In some embodiments, the first fluid circuit 34 may be disposed entirely outside of the cabin 20 of the vehicle 10 and may be fluidly isolated from the HVAC system 12. In such embodiments, the first fluid circuit 34 could circulate a working fluid such as R-152a, for example, which is currently not approved for use within vehicle cabins under some government regulations but is more efficient than some other working fluids like HFO-1234yf, for example.

The four-way valve 40 may include first, second, third and fourth fluid ports 50, 52, 54, 56. The four-way valve 40 may be in communication with the control module 49, which may be operable to move the four-way valve 40 between a first position and a second position. In the first position (FIG. 2), the first and second fluid ports 50, 52 may be in fluid communication with each other and the third and fourth fluid ports 54, 56 may be in communication with each other. In the second position (FIG. 3), the first fluid port 50 may be in fluid communication with the third fluid port 54, and the second fluid port 52 may be in fluid communication with the fourth fluid port 56. The four-way valve 40 could include any type of valve and may include any suitable configuration that enables the functionality described herein. For example, the four-way valve 40 could be of the type described in Assignee's commonly owned U.S. Pat. No. 6,574,976, the disclosure of which is hereby incorporated by reference.

A discharge port 58 of the compressor 38 may be in fluid communication with the first fluid port 50 of the four-way valve 40. The first heat exchanger 42 may be a liquid-cooled condenser, for example, and may be in fluid communication with the second fluid port 52 of the four-way valve 40. It will be appreciated that in some embodiments, the first heat exchanger 42 could be air-cooled. The expansion device 44 may be in fluid communication with the first heat exchanger 42 and the fourth fluid port 56 of the four-way valve 40. The expansion device 44 may include a solenoid valve, thermal expansion valve, a capillary tube or an orifice tube, for example, or any other suitable device. The second heat exchanger 46 may be a chiller, for example, and may be in fluid communication with the third fluid port 54 of the four-way valve 40 and the accumulator 48. The accumulator 48 may also be in fluid communication with a suction port 60 of the compressor 38.

The second fluid circuit 36 may define a fluid pathway including a pump 62, a first heat exchanging conduit 64, a first valve 66, a second heat exchanging conduit 68, a third heat exchanger 70, a second valve 72, a liquid reservoir 74, and a bypass conduit 76. The control module 49 may control operation of the pump 62, which may circulate a coolant such as a mixture of ethylene glycol and water, for example, or any other suitable fluid, throughout the second fluid circuit 36. The coolant circulating through the second fluid circuit 36 may be fluidly isolated from the working fluids in the first fluid circuit 34 and the HVAC system 12. The first heat exchanging conduit 64 may be fluidly coupled with the pump 62 and the first valve 66 and may be in heat transfer relation with the second heat exchanger 46 of the first fluid circuit 34 and the battery pack 14. While not specifically shown in the schematic representations of FIGS. 2 and 3, the first heat exchanging conduit 64 may be coiled around and/or through the second heat exchanger 46 of the first fluid circuit 34 and the battery pack 14 to facilitate heat transfer therebetween.

The first valve 66 may be a three-way valve in fluid communication with the first and second heat exchanging conduits 64, 68 and the bypass conduit 76. The first valve 66 may be in communication with the control module 49 which may be operable to move the first valve 66 between a first position and a second position. In the first position (FIG. 2), coolant in the first heat exchanging conduit 64 may be allowed to flow through the first valve 66 and into the second heat exchanging conduit 68, and coolant in the bypass conduit 76 may be prevented from flowing into either of the first or second heat exchanging conduits 64, 68. In the second position (FIG. 3), the first valve 66 may allow coolant in the first heat exchanging conduit 64 to flow through the first valve 66 and into the bypass conduit 76 and prevent the coolant from flowing into the second heat exchanging conduit 68.

The second heat exchanging conduit 68 may be in heat transfer relation with the first heat exchanger 42 of the first fluid circuit 34 and may be fluidly coupled with the third heat exchanger 70. While not specifically shown in the schematic representations of FIGS. 2 and 3, the second heat exchanging conduit 68 may be coiled around and/or through the first heat exchanger 42 of the first fluid circuit 34 to facilitate heat transfer therebetween.

The third heat exchanger 70 could be a radiator located proximate a grille at the front end of the vehicle 10, for example. Coolant flowing through the third heat exchanger 70 may reject heat to the ambient air. The fan 30 may force air across the third heat exchanger 70 to facilitate cooling of the coolant in the third heat exchanger 70. An outlet of the third heat exchanger 70 may be fluidly coupled with a first conduit 78.

The second valve 72 may be a three-way valve in fluid communication with the first conduit 78, a second conduit 80, and the bypass conduit 76. The second valve 72 may be in communication with the control module 49 which may cause the second valve 72 to move between a first position and a second position. In the first position (FIG. 2), the second valve 72 may allow coolant to flow from the first conduit 78 and into the second conduit 80 and prevent coolant flow into or out of the bypass conduit 76. In the second position (FIG. 3), the second valve 72 may allow coolant in the bypass conduit 76 to flow into the second conduit 80 and prevent coolant flow into the first conduit 78.

The second conduit 80 may be in fluid communication with the liquid reservoir 74 and an inlet of the pump 62. The liquid reservoir 74 may store a volume of the excess coolant from which the pump 62 may draw to ensure that an adequate amount of coolant flows into the pump 62.

With continued reference to FIGS. 1-3, operation of the battery heating and cooling system 16 will be described in detail. The battery heating and cooling system 16 may be operable in a cooling mode (FIG. 2) and a heating mode (FIG. 3) to control a temperature of the one or more batteries in the battery pack 14. One or more temperature sensors may be attached to or disposed proximate the one or more batteries to monitor their temperatures and communicate the temperatures to the control module 49. When the control module 49 determines that the battery pack 14 is above a predetermined temperature, the control module 49 may cause the battery heating and cooling system 16 to operate in the cooling mode. Conversely, when the control module 49 determines that the battery pack 14 is below a predetermined temperature, the control module 49 may cause the battery heating and cooling system 16 to operate in the heating mode.

In the cooling mode, the control module 49 may move the four-way valve 40 and the first and second valves 66, 72 to move into or remain in the first positions. The control module 49 may also cause the compressor 38 to circulate the working fluid through the first fluid circuit 34 and cause the pump 62 to circulate the coolant through the second fluid circuit 36.

In the cooling mode, the compressor 38 may receive the working fluid at a suction pressure and temperature and discharge the working fluid at a discharge pressure and temperature that may be substantially higher than the suction pressure and temperature. From the compressor 38, the working fluid may flow into the first fluid port 50 of the four-way valve 40. Because the four-way valve 40 is in the first position in the cooling mode, the fluid may then exit the four-way valve 40 through the second fluid port 52 and flow into the first heat exchanger 42. In the first heat exchanger 42, the working fluid may transfer heat to the coolant flowing through the second heat exchanging conduit 68 in the second fluid circuit 36. From the first heat exchanger 42, the working fluid may flow through the expansion device 44, to further reduce the temperature and pressure of the working fluid. From the expansion device 44, the working fluid may flow into the fourth fluid port 56 of the four-way valve 40 and exit the four-way valve 40 through the third fluid port 54. From the third fluid port 54, the working fluid may flow through the second heat exchanger 46 and absorb heat from the coolant in the first heat exchanging conduit 64 of the second fluid circuit 36. From the second heat exchanger 46, the working fluid may flow into the accumulator 48 before returning to the suction port 60 of the compressor 38, where the cycle may be repeated.

During the operation of the first fluid circuit 34 described above, the pump 62 may circulate the coolant through the second fluid circuit 36. The coolant may flow from the pump 62 to the first heat exchanging conduit 64, where heat is transferred from the coolant in the second fluid circuit 36 to the working fluid in the second heat exchanger 46 of the first fluid circuit 34. The reduced temperature coolant in the first heat exchanging conduit 64 downstream of the second heat exchanger 46 may then absorb heat from the battery pack 14 as it flows therethrough. The coolant may then flow through the first valve 66 (which is in the first position) to the second heat exchanging conduit 68 and absorb heat from the working fluid in the first heat exchanger 42 before flowing to the third heat exchanger 70.

In the third heat exchanger 70, heat from the coolant may be rejected to the ambient air being forced over the third heat exchanger 70 by the fan 30. From the third heat exchanger 70, the coolant may flow through the first conduit 78, through the second valve 72 (which is in the first position), through the second conduit 80 and back to the pump 62, where the cycle may be repeated. The cycles of the first and second fluid circuits 34, 36 may be repeated in this manner until the battery pack 14 is cooled below the predetermined threshold.

In some embodiments, if the ambient air outside of the vehicle 10 is sufficiently cool, the second fluid circuit 36 can be operated in the cooling mode without running the first fluid circuit 34. That is, when the ambient air is sufficiently cool, the coolant can be sufficiently cooled only by heat transfer with the ambient air flowing across the third heat exchanger 70 and may not need to be cooled by the working fluid in the second heat exchanger 46 to enable the coolant to effectively absorb heat from the battery pack 14. In some embodiments, ambient air below about thirty five degrees Celsius (ninety five degrees Fahrenheit) may be sufficiently cool for the second fluid circuit 36 to adequately cool the battery pack 14 without running the first fluid circuit 34.

In the heating mode (FIG. 3), the control module 49 may cause operation of the compressor 38 and the pump 62, as described above. However, in the heating mode, the control module 49 may cause the four-way valve 40 and the first and second valves 66, 72 to move into the second position. With the four-way valve 40 in the second position, the high temperature and pressure working fluid discharged from the compressor 38 flows into the first fluid port 50 of the four-way valve 40 and exits the four-way valve 40 through the third fluid port 54, bypassing the first heat exchanger 42 and the expansion device 44. Therefore, when the working fluid enters the second heat exchanger 46, the working fluid may still be at a relatively high temperature.

Because the working fluid in the second heat exchanger 46 is at a high temperature in the heating mode, the coolant in the first heat exchanging conduit 64 that comes into heat transfer relation with the second heat exchanger 46 absorbs heat from the working fluid. This causes the temperature of the coolant to rise prior to reaching the battery pack 14. Then, this relatively high-temperature coolant comes into heat transfer relation with the battery pack 14, thereby raising the temperature of the battery pack 14. The coolant may then flow to the first valve 66 (which is in the second position) and may be directed into the bypass conduit 76. The coolant may flow through the bypass conduit 76 to the second valve 72 where it is directed to the second conduit 80, through which the coolant is returned to the pump 62. The cycles of the first and second fluid circuits 34, 36 may repeat in this manner until the battery pack 14 warms up to a temperature above a predetermined threshold.

Figure 4:
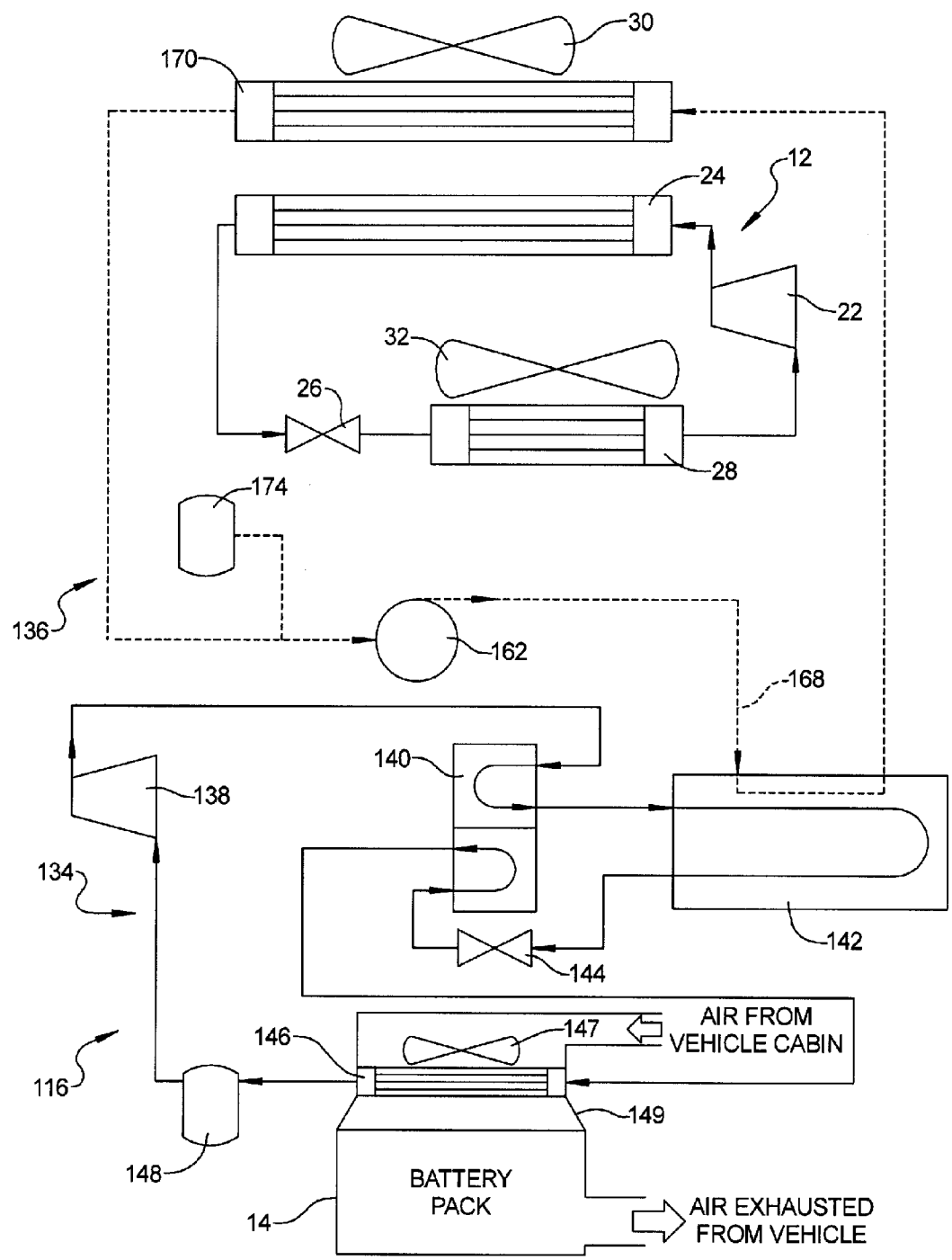
FIG. 4 is a schematic representation of another battery heating and cooling system in a cooling mode according to the principles of the present disclosure.
Figure 5:
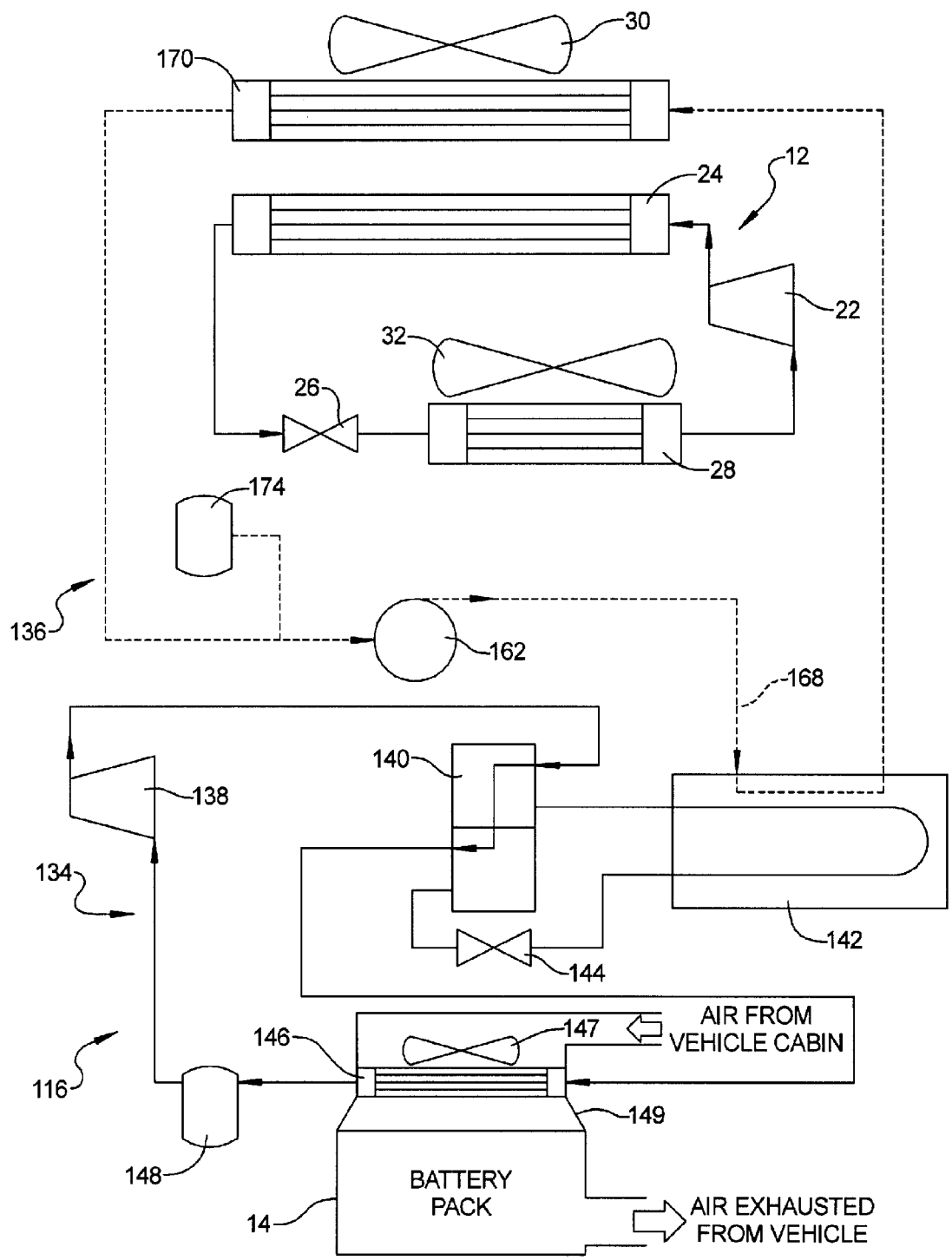
FIG. 5 is a schematic representation of the battery heating and cooling system of FIG. 4 in a heating mode according to the principles of the present disclosure.

With reference to FIGS. 4 and 5, another battery heating and cooling system 116 is provided and may include a first fluid circuit 134 and a second fluid circuit 136. The structure and function of the first fluid circuit 134 may be generally similar to the first fluid circuit 34 described above, apart from any exceptions noted below. The first fluid circuit 134 may include a compressor 138, a four-way valve 140, a first heat exchanger 142, an expansion device 144, a second heat exchanger 146, and an accumulator 148. Working fluid within the second heat exchanger 146 may be in heat transfer relation with a flow of air from within the cabin 20 of the vehicle 10 or from air outside of the vehicle 10. A fan 147 may force the air across the second heat exchanger 146 to facilitate heat transfer therebetween and force the air through a duct 149 in communication with the battery pack 14. The air flowing through the duct 149 may come into heat transfer relation with the battery pack 14 to absorb heat from the battery pack 14 in the when the battery heating and cooling system 116 is in the cooling mode and transfer heat to the battery pack 14 when the battery heating and cooling system 116 is in the heating mode.

Like the first fluid circuit 34 described above, when the first fluid circuit 134 is in the cooling mode, the working fluid flows from the compressor 138 to the four-way valve 140 (which may be in the first position shown in FIG. 4), to the first heat exchanger 142, to the expansion device 144, to the four-way valve 140 to the second heat exchanger 146. Therefore, in the cooling mode, the working fluid flowing through the second heat exchanger 146 is at a relatively low temperature and cools the air forced across it by the fan 147. This air then cools the battery pack 14 and may be subsequently exhausted from the vehicle 10. If the air within the cabin 20 is sufficiently cool, the cooling capacity of the fan 147, by itself, may be sufficient to adequately cool the battery pack 14 without running the first fluid circuit 134.

During operation of the first fluid circuit 134 in the cooling mode, the second fluid circuit 136 may be operated to cool the working fluid flowing through the first heat exchanger 142. The second fluid circuit 136 may include a pump 162, a heat exchanging conduit 168, a third heat exchanger 170, and a liquid reservoir 174. The pump 162 may force coolant through the heat exchanging conduit 168 which may be in heat transfer relation with the first heat exchanger 142 of the first fluid circuit 134. The coolant in the heat exchanging conduit 168 absorbs heat from the high-temperature working fluid in the first heat exchanger 142 and subsequently flows to the third heat exchanger 170. In the third heat exchanger 170, heat from the coolant may be rejected to ambient air. The fan 30 may force air across the third heat exchanger 170 to facilitate heat transfer. From the third heat exchanger 170, the coolant may return to the pump 162, where the cycle can be repeated.

In the heating mode, the four-way valve 140 may be in the second position (FIG. 5). Like the first fluid circuit 34, when the first fluid circuit 134 is in the heating mode, the working fluid flows from the compressor 138 to the four-way valve 140 and may flow directly to the second heat exchanger 146, bypassing the first heat exchanger 142 and the expansion device 144. Therefore, when the working fluid reaches the second heat exchanger 146 in the heating mode, the working fluid is still at a relatively high temperature and transfers heat to the air from the cabin 20 forced across it by the fan 147. The heated air then is forced across the battery pack 14 to transfer heat to the battery pack 14 to raise its temperature above a predetermined threshold. Because the working fluid does not flow through the first heat exchanger 142 in the heating mode, the second fluid circuit 136 may not need to operate when the battery heating and cooling system 116 is in the heating mode.

Figure 6:
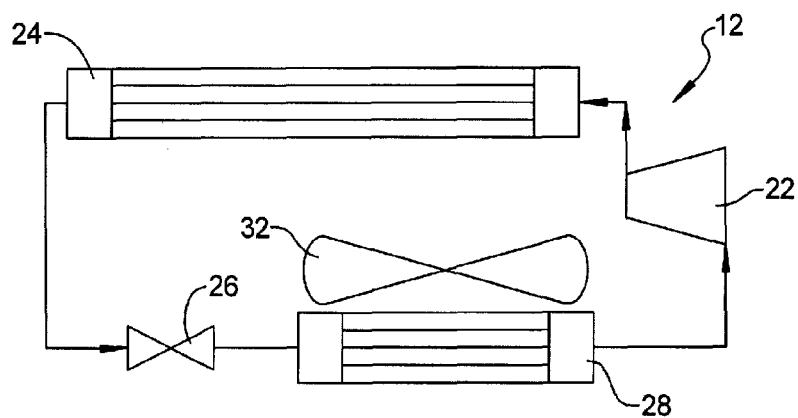
FIG. 6 is a schematic representation of yet another battery heating and cooling system in a cooling mode according to the principles of the present disclosure.
Figure 6:
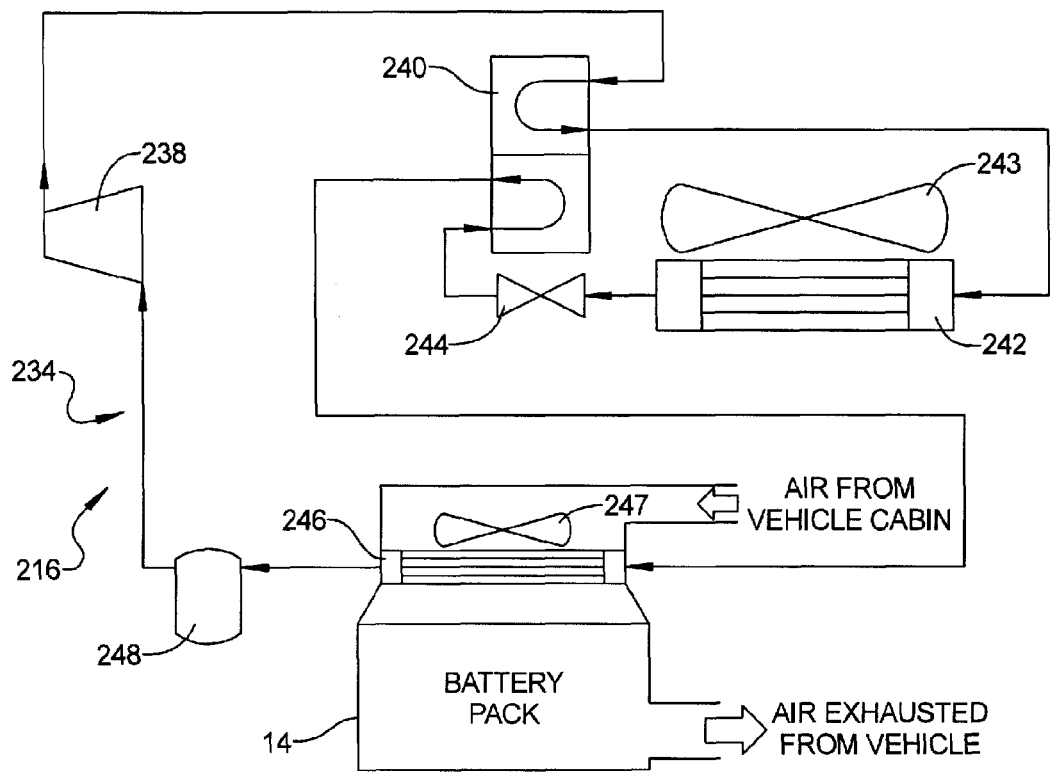
Figure 7:
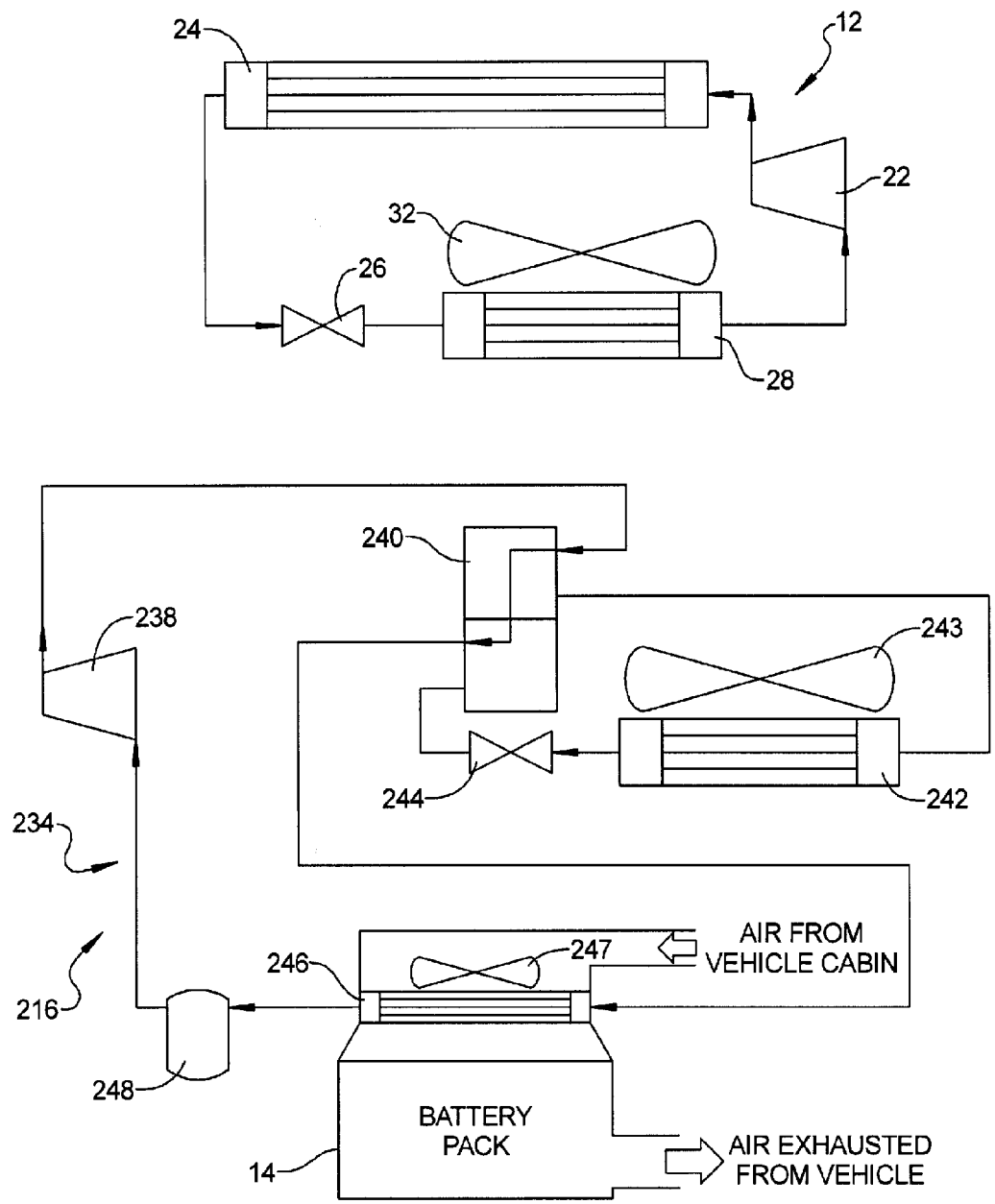
FIG. 7 is a schematic representation of the battery heating and cooling system of FIG. 6 in a heating mode according to the principles of the present disclosure.

With reference to FIGS. 6 and 7, another battery heating and cooling system 216 is provided and may include a fluid circuit 234. The structure and function of the fluid circuit 234 may be substantially similar to that of the first fluid circuit 134 described above, and therefore, will not be described again in detail. Briefly, the fluid circuit 234 may include a compressor 238, a four-way valve 240, a first heat exchanger 242, an expansion device 244, a second heat exchanger 246, a fan 247, and an accumulator 248. Like the first fluid circuit 134, the fluid circuit 234 may be operable in a cooling mode (FIG. 6) and a heating mode (FIG. 7). In addition to or in the alternative to a second fluid circuit (like the second fluid circuit 136), the fluid circuit 234 may include a fan 243 that may operate during the cooling mode to cool the working fluid within the first heat exchanger 242.

Figure 8:
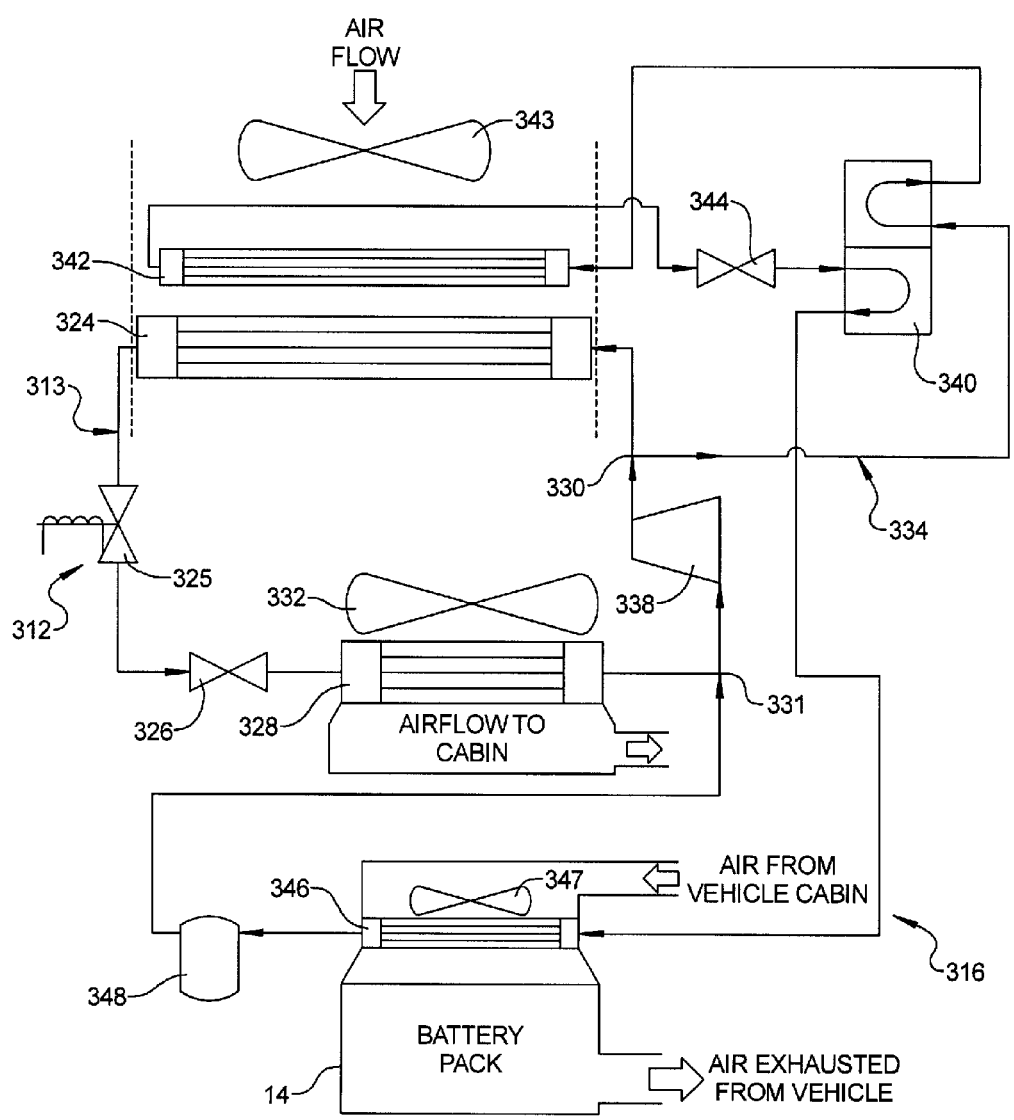
FIG. 8 is a schematic representation of yet another battery heating and cooling system in a cooling mode according to the principles of the present disclosure.
Figure 9:
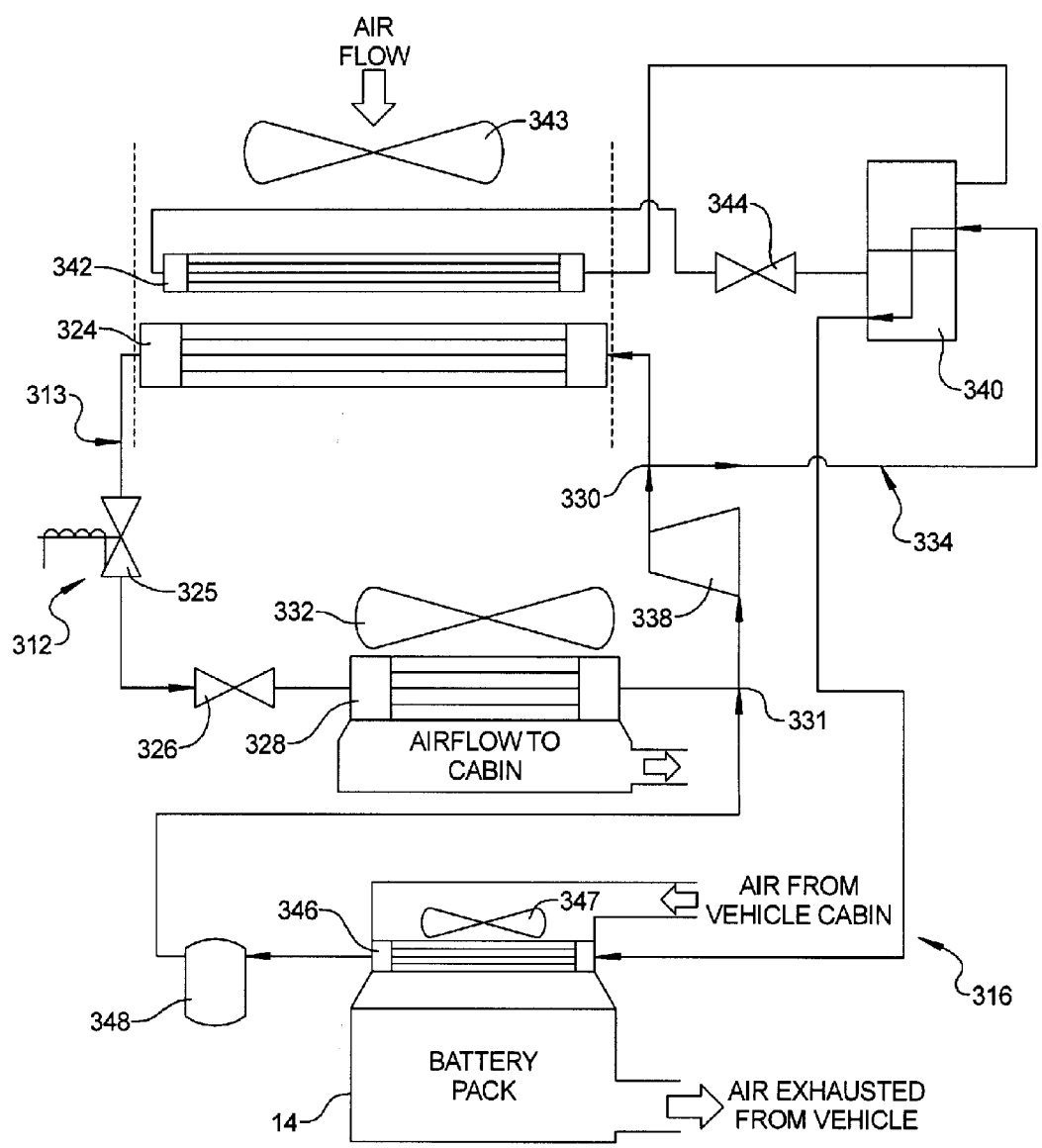
FIG. 9 is a schematic representation of the battery heating and cooling system of FIG. 8 in a heating mode according to the principles of the present disclosure.

With reference to FIGS. 8 and 9, yet another battery heating and cooling system 316 is provided and may include a first fluid circuit 334. The fluid circuit 334 may include a compressor 338, a four-way valve 340, a first heat exchanger 342, a first fan 343, an expansion device 344, a second heat exchanger 346, a second fan 347, and an accumulator 348. Like the battery heat and cooling systems 16, 116, 216, the battery heat and cooling system 316 may be operable in a cooling mode (FIG. 8) and a heating mode (FIG. 9). The structure and function of the four-way valve 340, first heat exchanger 342, first fan 343, expansion device 344, second heat exchanger 346, second fan 347, and accumulator 348 may be substantially similar to that of the four-way valve 240, a first heat exchanger 242, fan 243, expansion device 244, second heat exchanger 246, fan 247, and accumulator 248 described above, and therefore, will not be described again in detail.

The battery heating and cooling system 316 may be integrated with an HVAC system 312 in that the compressor 338 may circulate a working fluid through both the battery heating and cooling system 316 and the HVAC system 312. Like the HVAC system 12, the HVAC system 312 may include a fan 332 and a working fluid circuit 313 including a condenser 324, an expansion device 326, an evaporator 328, and the compressor 338. The condenser 324 may be disposed adjacent the first heat exchanger 342 so that the first fan 343 can force air across both the condenser 324 and the first heat exchanger 342 to cool the fluid therein. In some embodiments, the condenser 324 and the first heat exchanger 342 could be a single heat exchanger unit having first and second fluid paths therethrough corresponding to the fluid circuits 312, 334, respectively.

A first three-way joint 330 may be disposed downstream of the compressor 338 and upstream of the condenser 324 and the four-way valve 340. A second three-way joint 331 may be disposed upstream from the compressor 338 and downstream of the evaporator 328 and the accumulator 348. The fluid circuits 334, 313 may diverge from each other at the first three-way joint 330 and converge back together at the second three-way joint 331.

The working fluid circuit 313 may also include a valve 325 that may be movable between first and second positions to respectively allow and prevent fluid discharged from the compressor 338 to flow through the rest of the working fluid circuit 313. The four-way valve 340, the expansion device 344 and/or any other device disposed downstream of the first three-way joint 330 and upstream of the second three-way joint 331 may be configured to selectively allow or prevent fluid flow through the fluid circuit 334. Accordingly, the battery heating and cooling system 316 and the HVAC system 312 can operate simultaneously or independently from each other.

Figure 10:
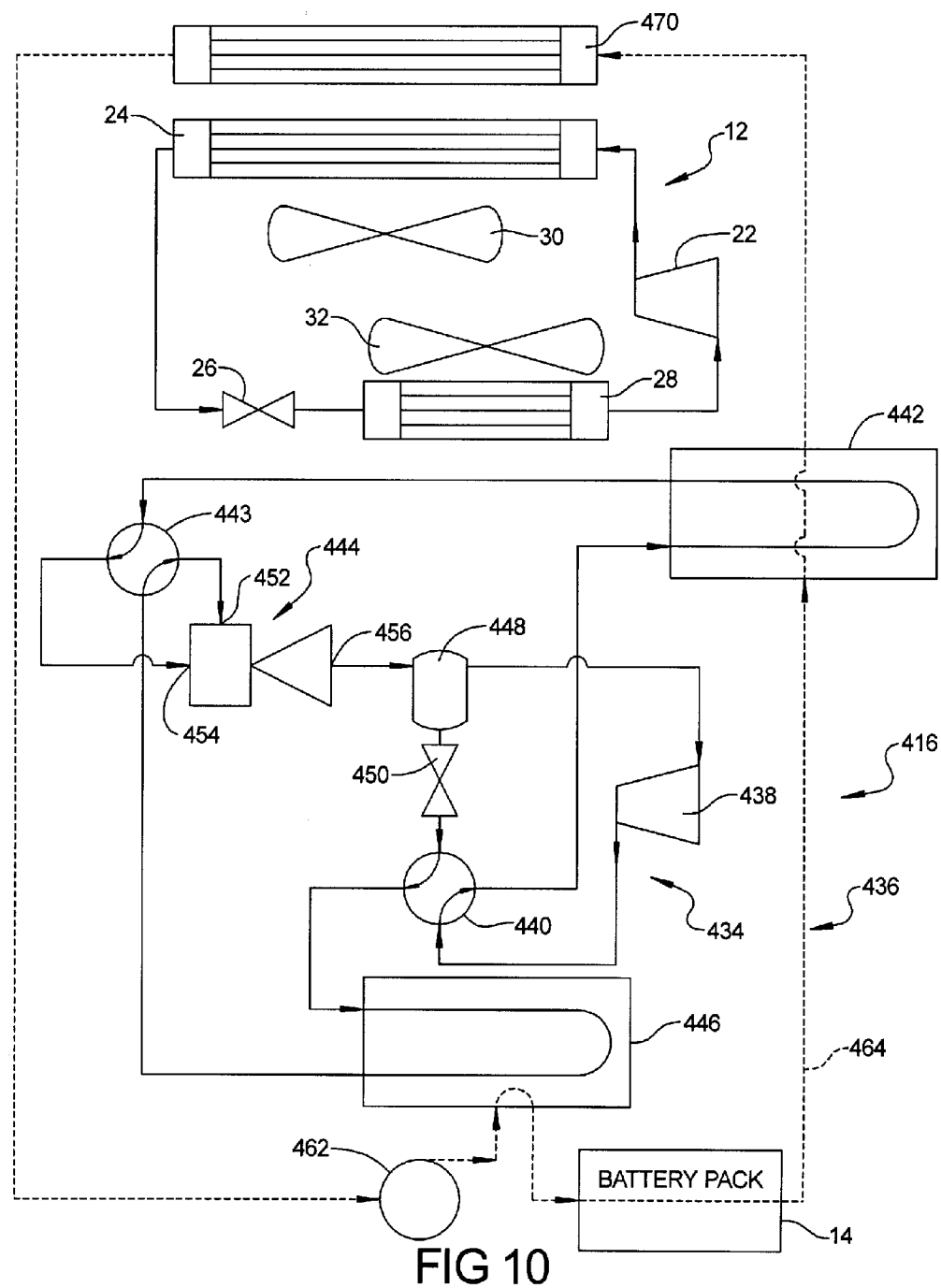
FIG. 10 is a schematic representation of yet another battery heating and cooling system in a cooling mode according to the principles of the present disclosure.
Figure 11:
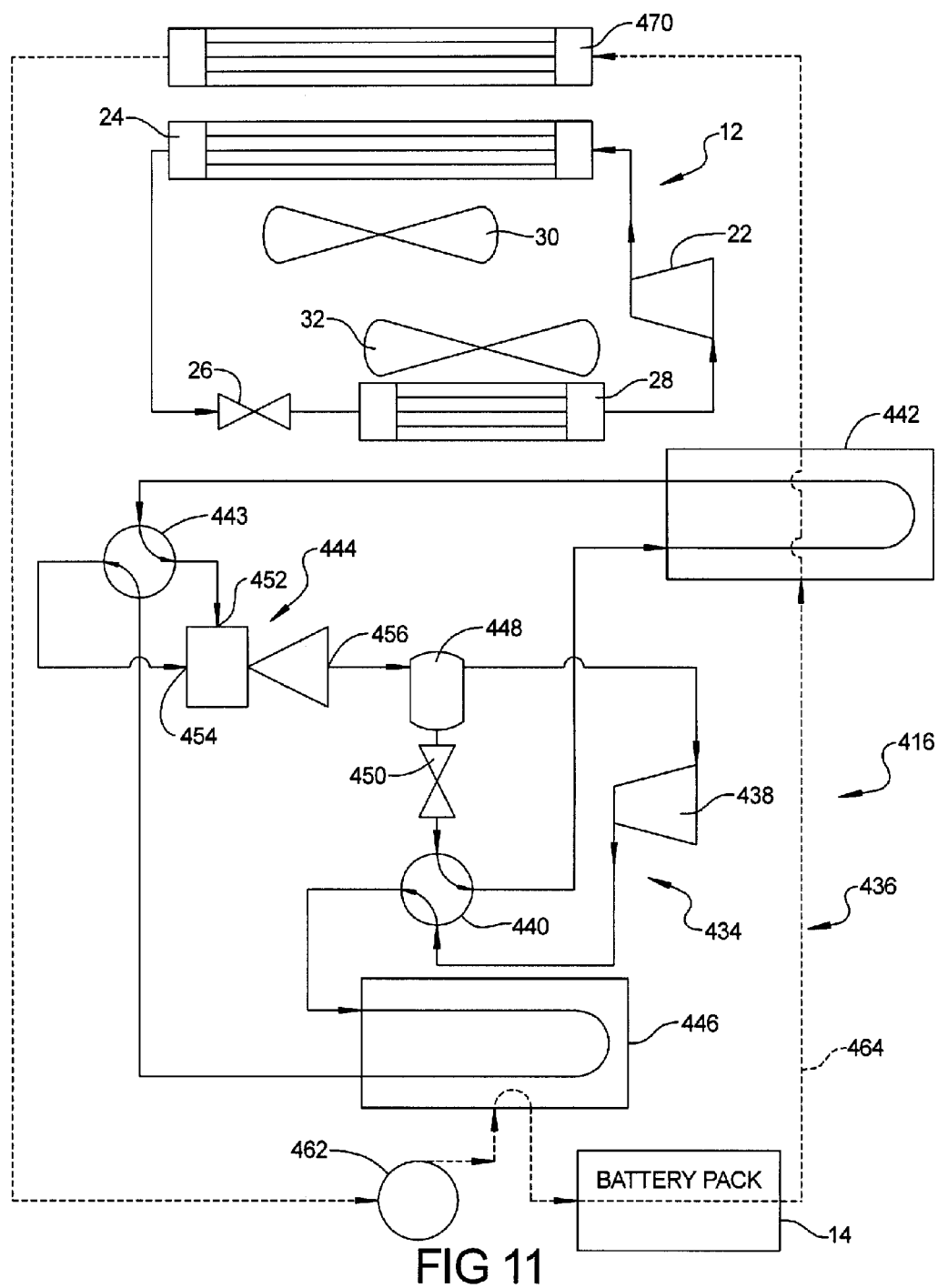
FIG. 11 is a schematic representation of the battery heating and cooling system of FIG. 10 in a heating mode according to the principles of the present disclosure.

With reference to FIGS. 10 and 11, a battery heating and cooling system 416 is provided and may include a first fluid circuit 434 and a second fluid circuit 436. Like the battery heating and cooling system 16, the battery heating and cooling system 416 may be operable in a cooling mode (FIG. 10) and a heating mode (FIG. 11) to respectively cool and heat the battery pack 14.

The first fluid circuit 434 may include a compressor 438, a first four-way valve 440, a first heat exchanger 442, a second four-way valve 443, an ejector 444, a second heat exchanger 446, an accumulator 448, and a restriction device 450. The first and second heat exchangers 442, 446 may be substantially similar to the first and second heat exchangers 42, 46 described above. The first heat exchanger 442 may be in heat transfer relation with the second fluid circuit 436. The second heat exchanger 446 may be in heat transfer relation with the battery pack 14 via the second fluid circuit 436. That is, the second heat exchanger 446 may be in direct heat transfer relation with the second fluid circuit 436, and the second fluid circuit 436 may be in direct heat transfer relation with the battery pack 14 to transfer heat between the second heat exchanger 446 and the battery pack 14.

The structure and function of the ejector 444 may be substantially similar to that of the ejector described in Assignee's commonly owned U.S. Pat. No. 6,550,265, the disclosure of which is hereby incorporated by reference. Briefly, the ejector 444 may include a first and second inlets 452, 454 and an outlet 456. While not specifically shown in FIGS. 10 and 11, the ejector also includes a nozzle, a mixing portion and a diffuser. The ejector 444 may utilize energy that is typically lost during expansion of condensed working fluid in a conventional vapor compression cycle.

The accumulator 448 may separate liquid and gaseous working fluid and may store a volume of liquid working fluid therein. The restriction device 450 may include a capillary tube, for example. The restriction device 450 reduces the pressure of working fluid that flows therethrough.

With continued reference to FIGS. 10 and 11, operation of the battery heating and cooling system 416 will be described in detail. In the cooling mode (FIG. 10), the working fluid is discharged from the compressor 438 and flows through the first four-way valve 440 (which is in a first position) to the first heat exchanger 442. The high-pressure liquid working fluid flows from the first heat exchanger 442, through the second four-way valve (which is in a first position) and into the ejector 444, to be decompressed and expanded by the nozzle within the ejector 444.

In the mixing portion of the ejector 444, gaseous working fluid from the second heat exchanger 446 is mixed with the working fluid jetted from the nozzle. The pressure of the mixed refrigerant is increased in the mixing portion and the diffuser, and the mixed working fluid flows into the accumulator 448 from the outlet 456 of the ejector 444. At this time, since working fluid in the second heat exchanger 446 is drawn into the ejector 444, liquid refrigerant flows from the accumulator 448, through the restriction device 450, and into the second heat exchanger 446. As will be subsequently described, the working fluid in the second heat exchanger 446 absorbs heat from fluid in the second fluid circuit 436.

In the heating mode (FIG. 11), the first and second four-way valves 440, 443 are switched to second positions. High-pressure and high-temperature refrigerant discharged from the compressor 438 flows through the first four-way valve 440 to the second heat exchanger 446, where heat from the working fluid is transferred to fluid in the second fluid circuit 436. The high-pressure liquid refrigerant then flows from the second heat exchanger 446 through the second four-way valve 443 and into the ejector 444, where the working fluid is decompressed and expanded in the nozzle of the ejector 444 to become a gas-liquid two-phase state.

In the mixing portion of the ejector 444, gaseous working fluid is drawn from the first heat exchanger 442 and is mixed with the working fluid jetted from the nozzle. The pressure of the mixed working fluid is increased in the mixing portion and the diffuser. The mixed working fluid then exits the ejector 444 and flows into the accumulator 448. At this time, since working fluid in the first heat exchanger 442 is drawn into the ejector 444, liquid working fluid flows from the accumulator 448, through the restriction device 450, and into the first heat exchanger 442. Working fluid in the first heat exchanger 442 absorbs heat from the second fluid circuit 436.

The second fluid circuit 436 may include a pump 462, a heat exchanging conduit 464, and a third heat exchanger 470. The pump 462 may circulate a coolant through the second fluid circuit 436 during operation of the battery heating and cooling system 416. The heat exchanging conduit 464 may be in heat transfer relation with the first and second heat exchangers 442, 446 and the battery pack 14.

As described above, when the battery heating and cooling system 416 is operating in the cooling mode, low-temperature working fluid may be flowing through the second heat exchanger 446 and may absorb heat from the coolant in a portion of the heat exchanging conduit 464 that in heat transfer relation therewith. Reduced-temperature coolant may then flow to the battery pack 14 and absorb heat from the battery pack 14. From the battery pack 14, the coolant may flow through the first heat exchanger 442 and absorb heat from the working fluid therein. From the first heat exchanger 442, the coolant may flow through the third heat exchanger 470, where heat from the coolant may be rejected to the ambient air forced across the third heat exchanger 470 by the fan 30. From the third heat exchanger 470, the coolant may return to the pump 462, where the cycle may be repeated until the battery pack 14 is cooled to a predetermined temperature. In some embodiments, if the ambient air outside of the vehicle 10 is sufficiently cool, the second fluid circuit 436 can be operated to cool the battery pack 14 without running the first fluid circuit 434.

When the battery heating and cooling system 416 is operating in the heating mode, high-temperature working fluid may be flowing through the second heat exchanger 446. The coolant in the heat exchanging conduit 464 may absorb heat from the working fluid in the second heat exchanger 446. Relatively high-temperature coolant may then flow to the battery pack 14, which absorbs heat from the coolant. From the battery pack 14, the coolant may flow through the first heat exchanger 442 and transfer heat to the working fluid therein. From the first heat exchanger 442, the coolant may flow through the third heat exchanger 470, where heat from the coolant may be rejected to the ambient air. From the third heat exchanger 470, the coolant may return to the pump 462, where the cycle may be repeated until the battery pack 14 reaches a predetermined temperature.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
   a first heat exchanger;
   an expansion device in direct fluid communication with the first heat exchanger;
   a pumping device in fluid communication with the first heat exchanger; and
   a valve receiving a fluid from the pumping device and movable between a first position allowing the fluid through a first flow path and a second position to allow the fluid to flow through a second flow path,
   a second heat exchanger;
   an energy storage device in heat transfer relation to the second heat exchanger; wherein
   when the valve is in the first position, the first flow path extends from the valve through the first heat exchanger and from the first heat exchanger through the second heat exchanger; and
   when the valve is in the second position, the second flow path extends from the valve, through the second heat exchanger bypassing the first heat exchanger.

2. The system of claim 1, wherein the pumping device includes a compressor receiving the fluid at a first pressure and compressing the fluid to a second pressure higher than the first pressure.

3. The system of claim 2, further comprising a fluid circuit that is fluidly isolated from the first heat exchanger, the compressor and the valve, the fluid circuit being in heat transfer relation with the first heat exchanger and the energy storage device.

4. The system of claim 1, further comprising a vehicle air conditioning system including a fluid circuit that is fluidly isolated from the pumping device, the first heat exchanger and the valve.

5. The system of claim 1, further comprising a vehicle air conditioning system, wherein the including a second heat exchanger disposed adjacent the first heat exchanger, wherein a fan is disposed adjacent one of said first and second heat exchangers and forces air across said first and second heat exchangers.

6. The system of claim 1, wherein the second heat exchanger in fluid communication with the first heat exchanger and the pumping device when the valve is in the first position and fluidly isolated from the first heat exchanger and the pumping device when the valve is in the second position.

7. The system of claim 6, wherein the second heat exchanger includes a liquid-cooled condenser.

8. The system of claim 1, further comprising an ejector in fluid communication with the pumping device.

9. The system of claim 1, wherein the first heat exchanger is a single heat exchanger.

10. The system of claim 1, wherein:
    when the valve is in the first position, the first flow path extends from the valve directly to the first heat exchanger and from the first heat exchanger through the expansion device, through the valve directly to the second heat exchanger; and
    when the valve is in the second position, the second flow path extends from the valve, directly to the second heat exchanger bypassing the first heat exchanger.

11. A system for a vehicle, the vehicle having a cabin and a battery, the system comprising:

a first fluid path including a first heat exchanger providing a cooling effect to air within the cabin;
an expansion device in direct fluid communication with the first heat exchanger; and
a second fluid path including a second heat exchanger and a valve, the second heat exchanger being in heat transfer relation with the battery, the valve being movable between a first position allowing fluid at a first temperature to flow through the second heat exchanger to extract heat from the battery and a second position allowing fluid at a second temperature to flow through the second heat exchanger to transfer heat from the fluid to the battery; wherein
when the valve is in the first position, fluid flows from the valve to the first heat exchanger and from the first heat exchanger to the second heat exchanger; and
when the valve is in the second position, fluid flows from the valve to the second heat exchanger bypassing the first heat exchanger.

12. The system of claim 11, wherein the second fluid path includes a compressor disposed upstream from the second heat exchanger.

13. The system of claim 11, wherein the second fluid path includes a third heat exchanger in fluid communication with the second heat exchanger when the valve is in the first position and is restricted from fluid communication with the second heat exchanger when the valve is in the second position.

14. The system of claim 11, wherein the first fluid path includes a first compressor and the second fluid path includes a second compressor, the first and second fluid paths being fluidly isolated from each other.

15. The system of claim 11, further comprising a compressor circulating a fluid through the first and second fluid paths.

16. The system of claim 11, further comprising a third fluid path that is fluidly isolated from the first and second fluid paths, the third fluid path being in heat transfer relation with the battery and the second heat exchanger.

17. The system of claim 11, wherein the second heat exchanger is a single heat exchanger.

18. The system of claim 11, wherein:
when the valve is in the first position, fluid flows from the valve directly to the first heat exchanger and from the first heat exchanger to the expansion device through the expansion device to the valve, through the valve directly to the second heat exchanger; and
when the valve is in the second position, fluid flows from the valve directly to the second heat exchanger bypassing the first heat exchanger.

* * * * *

UNITED STATES PATENT AND TRADEMARK OFFICE
CERTIFICATE OF CORRECTION

PATENT NO.         : 9,016,080 B2
APPLICATION NO.    : 13/051438
DATED              : April 28, 2015
INVENTOR(S)        : Bradley Brodie et al.

Page 1 of 1

It is certified that error appears in the above-identified patent and that said Letters Patent is hereby corrected as shown below:

In the Claims

Col. 12, line 40, claim 5, after "the", delete "including a".

Signed and Sealed this
Fifteenth Day of September, 2015

Michelle K. Lee
*Director of the United States Patent and Trademark Office*